United States Patent
Okochi et al.

(10) Patent No.: US 10,442,736 B2
(45) Date of Patent: Oct. 15, 2019

(54) MG-CONTAINING ZINC OXIDE SINTERED BODY AND METHOD FOR PRODUCING SAME

(71) Applicant: NGK INSULATORS, LTD., Nagoya-Shi (JP)

(72) Inventors: Sota Okochi, Nagoya (JP); Jun Yoshikawa, Nagoya (JP); Koichi Kondo, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 15/419,066

(22) Filed: Jan. 30, 2017

(65) Prior Publication Data

US 2017/0137325 A1 May 18, 2017

Related U.S. Application Data

(63) Continuation of application No. PCT/JP2015/074542, filed on Aug. 28, 2015.

(30) Foreign Application Priority Data

Sep. 4, 2014 (JP) .................................. 2014-180656

(51) Int. Cl.
| | | |
|---|---|---|
| *C04B 35/453* | (2006.01) | |
| *H01B 1/02* | (2006.01) | |
| *C01G 9/02* | (2006.01) | |
| *C04B 35/64* | (2006.01) | |
| *C04B 35/645* | (2006.01) | |

(52) U.S. Cl.
CPC .............. *C04B 35/453* (2013.01); *C01G 9/02* (2013.01); *C04B 35/64* (2013.01); *C04B 35/6455* (2013.01); *H01B 1/023* (2013.01); *C01P 2002/50* (2013.01); *C01P 2002/52* (2013.01); *C01P 2004/20* (2013.01); *C01P 2004/61* (2013.01); *C01P 2004/62* (2013.01); *C04B 2235/3206* (2013.01); *C04B 2235/3213* (2013.01); *C04B 2235/3215* (2013.01); *C04B 2235/3217* (2013.01); *C04B 2235/3224* (2013.01); *C04B 2235/3225* (2013.01); *C04B 2235/3227* (2013.01); *C04B 2235/3229* (2013.01); *C04B 2235/3232* (2013.01); *C04B 2235/3241* (2013.01); *C04B 2235/3244* (2013.01); *C04B 2235/3251* (2013.01); *C04B 2235/3258* (2013.01); *C04B 2235/3262* (2013.01); *C04B 2235/3279* (2013.01); *C04B 2235/3284* (2013.01); *C04B 2235/3286* (2013.01); *C04B 2235/3287* (2013.01); *C04B 2235/3293* (2013.01); *C04B 2235/3298* (2013.01); *C04B 2235/3409* (2013.01); *C04B 2235/3418* (2013.01); *C04B 2235/444* (2013.01); *C04B 2235/445* (2013.01); *C04B 2235/5436* (2013.01);

(Continued)

(58) Field of Classification Search
CPC ... C04B 35/453; C04B 35/64; C04B 35/6455; C04B 2235/3206; C04B 2235/3213; C04B 2235/3215; C04B 2235/3217; C04B 2235/3224; C04B 2235/3225; C04B 2232/3229; C04B 2235/3232; C04B 2235/3241; C04B 2235/3244; C04B 2235/3251; C04B 2235/3258; C04B 2235/3262; C04B 2235/3279; C04B 2235/3284; C04B 2235/3286; C04B 2235/3287; C04B 2235/3293; C04B 2235/3298; C04B 2235/3409; C04B 2235/444; C04B 2235/3227; C04B 2235/445; C04B 2235/5436; C04B 2235/5445; C04B 2235/6025; C04B 2235/6587; C04B 2235/661; C04B 2235/786; C04B 2235/787; C04B 2235/788; C04B 2235/96; C04B 2235/9653; C01G 9/02; H01B 1/023; C01P 2002/50; C01P 2002/52; C01P 2004/20; C01P 2004/61; C01P 2004/62
USPC ........................................................ 252/500
See application file for complete search history.

(56) References Cited

U.S. PATENT DOCUMENTS

| | | | |
|---|---|---|---|
| 2009/0101493 A1* | 4/2009 | Nakayama ............ | C04B 35/453 204/192.11 |
| 2010/0132783 A1* | 6/2010 | Le ....................... | C23C 14/0036 136/256 |
| 2015/0372191 A1* | 12/2015 | Watanabe ............... | H01L 33/16 257/43 |

FOREIGN PATENT DOCUMENTS

| | | |
|---|---|---|
| WO | 2007/141994 A1 | 12/2007 |
| WO | 2014/092165 A1 | 6/2014 |

OTHER PUBLICATIONS

Biswas et al. "Structural and Optical Characterization of Magnesium Doped Zinc Oxide Thin Films Deposited by Spray Pyrolysis". Dhaka Univ. J Sci 64)1: 1-6, 2016. Total pp. 6. (Year: 2015).*

(Continued)

*Primary Examiner* — Harold Y Pyon
*Assistant Examiner* — Danny N Kang
(74) *Attorney, Agent, or Firm* — Burr & Brown, PLLC

(57) ABSTRACT

There is provided a platy Mg-containing zinc oxide sintered compact containing 1 to 10 wt % Mg as a first dopant element and 0.005 wt % or more at least one second dopant element selected from the group consisting of Al, Ga and In, the balance consisting essentially of ZnO and optionally at least one third dopant element selected from the group consisting of Br, Cl, F, Sn, Y, Pr, Ge, B, Sc, Si, Ti, Zr, Hf, Mn, Ta, W, Cu, Ni, Cr, La, Gd, Bi, Ce, Sr and Ba, wherein the (002)-plane or (100)-plane orientation in the plate surface is 60% or more. The Mg-containing zinc oxide sintered compact of the present invention has excellent properties such as high orientation despite solid dissolution of Mg.

20 Claims, No Drawings

(52) U.S. Cl.
CPC ............ *C04B 2235/5445* (2013.01); *C04B 2235/6025* (2013.01); *C04B 2235/6587* (2013.01); *C04B 2235/661* (2013.01); *C04B 2235/786* (2013.01); *C04B 2235/787* (2013.01); *C04B 2235/788* (2013.01); *C04B 2235/96* (2013.01); *C04B 2235/9653* (2013.01)

(56) References Cited

OTHER PUBLICATIONS

International Search Report and Written Opinion (With English Translation), International Application No. PCT/JP2015/074542, dated Nov. 10, 2015 (12 pages).
Tanaka, et al., "Fabrication of Wide-Band-Gap $Mg_xZn_{1-x}O$ Quasi-Ternary Alloys by Molecular-Beam Epitaxy," *Applied Physics Letters*, 86, pp. 192911-1 to 192911-3, dated 2005.
Seabaugh, et al., "Texture Development by Templated Grain Growth in Liquid-phase-Sintered α-Alumina," *Journal of the American Ceramic Society*, vol. 80, No. 5, pp. 1181-1188, dated 1997.
Suvaci, et al., "Critical Factors in the Templated Grain Growth of Textured Reaction-Bonded Alumina," *Journal of the American Ceramic Society*, vol. 83, No. 8, pp. 2041-2048, dated 2000.
Chang, et al., "Fabrication of Highly Textured Fine-Grained α-Alumina by Templated Grain Growth of Nanoscale Precursors," Journal of the American Ceramic Society, vol. 96, No. 5, pp. 1390-1397, dated 2013.
Suvaci, et al., "Processing of Textured Zinc Oxide Varistors Via Templated Grain Growth," *Journal of the European Ceramic Society*, vol. 25, pp. 1663-1673, dated 2005.
Han, et al., "Cathodoluminescence of Single Disk-Like AnO Prepared by Low Temperature Solution-Based Method," *e-Journal of Surface Science and Nanotechnology*, vol. 7, pp. 354-357, dated Apr. 4, 2009.
Ogawa, et al., "Study of ZAO Targets (2) Effect of Target Crystallographic Orientation," *Journal of TOSOH Research*, vol. 36, No. 2, pp. 161-168, dated Jul. 1, 1992.

\* cited by examiner

MG-CONTAINING ZINC OXIDE SINTERED BODY AND METHOD FOR PRODUCING SAME

CROSS-REFERENCE TO RELATED APPLICATIONS

This application is a continuation application of PCT/JP2015/074542 filed Aug. 28, 2015, which claims priority to Japanese Patent Application No. 2014-180656 filed Sep. 4, 2014, the entire contents all of which are incorporated herein by reference.

BACKGROUND OF THE INVENTION

1. Field of the Invention

The present invention relates to a Mg-containing zinc oxide sintered compact and a method for producing the same.

2. Description of the Related Art

Oriented zinc oxide (ZnO) substrates having high transparency and high conductivity are expected to be substrates for optical devices including light emitting devices (such as light emitting diodes (LEDs) and surface light emitting devices), and optical devices (such as solar cells and light sensors). For example, Patent Document 1 (WO2014/092165) discloses a surface emitting device including an oriented zinc oxide substrate. A zinc oxide material having both conductivity and light transmission can be subjected to ultrafine processing without electrical charge even by a focused ion beam (FIB) process, and is expected to be used as a functional device material constituting an optical MEMS which utilizes light transmission and optical characteristics of zinc oxide. Expansion of the band gap by Mg solid solution is required in the case where an oriented zinc oxide substrate is used as an ultraviolet light emitting device (Non-Patent Document 1 (Hiroshi Tanaka et. al., Appl. Phys. Lett. 86, 192911 (2005))).

Orientation is important for oriented zinc oxide substrates used as light emitting devices (such as LEDs and surface light emitting devices) or optical devices (such as solar cells and optical sensors). For example, the Patent Document 1 discloses a surface emitting device having an oriented polycrystalline zinc oxide sintered compact as a substrate, the zinc oxide sintered compact being oriented in a (100) plane, a (002) plane, or a (101) plane and having an orientation degree of 50% or more.

The template grain growth (TGG) is known for producing an oriented sintered compact. In the TGG, template particles having shape anisotropy and matrix particles having equiaxiality are used to prepare a green compact such that the oriented template particles are dispersed in the matrix particles, and then the green compact is calcined to produce an oriented ceramic. For example, Non-Patent Document 2 (Matthew M. et. al., J. Am. Ceram. Soc., 80 [5], pp. 1181-1188 (1997)), Non-Patent Document 3 (Ender Suvaci et. al., J. Am. Ceram. Soc., 83 [8], pp. 2041-2048 (2000)), and Non-Patent Document 4 (Yunfei Chang et. al., J. Am. Ceram. Soc., 96 [5], pp. 1391-1397 (2013)) disclose the production of oriented alumina sintered bodies using the TGG method. Furthermore, Non-Patent Document 5 (Ender Suvaci et. al., J. Euro. Ceram. Soc., 25, pp. 1663-1673 (2005)) discloses the production of an oriented zinc oxide sintered compact by TGG.

CITATION LIST

Patent Document

Patent Document 1: WO2014/092165

Non-Patent Documents

Non-Patent Document 1: Hiroshi Tanaka et. al., Appl. Phys. Lett. 86, 192911 (2005)
Non-Patent Document 2: Matthew M. et. al., J. Am. Ceram. Soc., 80 [5], pp. 1181-1188 (1997)
Non-Patent Document 3: Ender Suvaci et. al., J. Am. Ceram. Soc., 83 [8], pp. 2041-2048 (2000)
Non-Patent Document 4: Yunfei Chang et al., J. Am. Ceram. Soc., 96 [5], pp. 1391-1397 (2013)
Non-Patent Document 5: Ender Suvaci et. al., J. Euro. Ceram. Soc., 25, pp. 1663-1673 (2005)
Non-Patent Document 6: Gui Han et. al., e-J. Surf. Sci. Nanotech. Vol. 7 (2009) 354-357

SUMMARY OF THE INVENTION

As described above, in order to expand the band gap, it is desirable to dissolve Mg in the oriented zinc oxide substrate. In the oriented zinc oxide substrate, however, it is difficult to achieve solid dissolution of Mg and orientation of the matrix at the same time, which thus has not been achieved so far. It is also difficult to achieve orientation and transparency at the same time under solid dissolution of Mg, which thus has not been achieved so far. Attempts have been made to fabricate oriented zinc oxide substrates where zinc oxide powder having only platy particles or spherical particles is mixed with MgO or $Al_2O_3$ (e.g., by adding MgO singly or co-adding MgO and $\gamma$-$Al_2O_3$) to fabricate oriented zinc oxide substrates by press shaping or tape casting. The orientation of the resulting zinc oxide substrates, however, was still low regardless of the sole addition of MgO or co-addition of MgO and $Al_2O_3$. It was, therefore, significantly difficult to prepare a zinc oxide sintered compact excellent in orientation (or both orientation and transparency) under solid dissolution of Mg. In this respect, the present inventors co-doped Mg (hereinafter also referred to as a first dopant) and a second dopant such as Al by the template grain growth (TGG) to successfully prepare a zinc oxide sintered compact having a significantly high (002)-plane or (100)-plane orientation (60% or more, desirably 70% or more, for example 99% or more) in the plate surface. That is, both solid dissolution of Mg and orientation were achieved. This method allows the resistivity of the zinc oxide sintered compact to decrease to a usable level as a conductive material, for example, less than $2 \times 10^{-2}$ $\Omega \cdot cm$ or less than $2 \times 10^{0}$ $\Omega \cdot cm$ depending on the application. Furthermore, the transparency of the zinc oxide sintered compact can also be improved. In addition, the Mg solid solution can control the band gap of the zinc oxide substrate.

The present inventors have found that there can be provided a Mg-containing zinc oxide sintered compact having solid-dissolved Mg and good properties such as orientation.

Accordingly, an object of the present invention is to provide a Mg-containing zinc oxide sintered compact having high orientation despite solid dissolution of Mg and a method for producing the sintered compact.

According to a first aspect of the present invention, there is provided a platy Mg-containing zinc oxide sintered compact containing 1 to 10 wt % Mg as a first dopant element and 0.005 wt % or more at least one second dopant element selected from the group consisting of Al, Ga and In, the balance consisting essentially of ZnO and optionally at least one third dopant element selected from the group consisting of Br, Cl, F, Sn, Y, Pr, Ge, B, Sc, Si, Ti, Zr, Hf, Mn, Ta, W, Cu, Ni, Cr, La, Gd, Bi, Ce, Sr and Ba, wherein the (002)-plane or (100)-plane orientation in the plate surface is 60% or more.

According to a second aspect of the present invention, there is provided a method for producing a Mg-containing zinc oxide sintered compact according to the first aspect, comprising the steps of:

i) providing template particles comprising ZnO and/or a precursor thereof having shape anisotropy and functioning as a template for promoting crystal orientation, and matrix particles comprising ZnO and/or its precursor having an average size smaller than or equal to the average size of the template particles, ii) mixing the template particles and the matrix particles to yield a mixture, iii) shaping the mixture into an oriented green compact, the template particles being oriented in one direction due to the shape anisotropy in the oriented green compact, and iv) heat-treating the oriented green compact to yield a Mg-containing zinc oxide sintered compact, wherein prior to preparation of the oriented green compact, the first dopant element, the second dopant element, and optionally the third dopant element are added to or preliminarily contained in the template particles and/or the matrix particles.

DESCRIPTION OF EMBODIMENT

Zinc Oxide Sintered Compact

The Mg-containing zinc oxide sintered compact according to the present invention is a platy Mg-containing zinc oxide sintered compact containing 1 to 10 wt % Mg as a first dopant element of and 0.005 wt % or more a second dopant element, the balance consisting essentially of ZnO and optionally a third dopant element. The second dopant element is at least one element selected from the group consisting of Al, Ga and In. The third dopant element is at least one optional element selected from the group consisting of Br, Cl, F, Sn, Y, Pr, Ge, B, Sc, Si, Ti, Zr, Hf, Mn, Ta, W, Cu, Ni, Cr, La, Gd, Bi, Ce, Sr and Ba. In this zinc oxide sintered compact, the (002)-plane or (100)-plane orientation in the plate surface is 60% or more. That is, as described above, solid dissolution of Mg in an oriented zinc oxide substrate is desirable to expand the band gap. It is, however, significantly difficult to prepare a zinc oxide sintered compact excellent in orientation (or orientation and transparency) under solid dissolution of Mg. We have successfully prepared a zinc oxide sintered compact having a significantly high (002)-plane or (100)-plane orientation (60% or more, desirably 70% or more, for example 99% or more) in the plate surface by allowing respective predetermined amounts of Mg (the first dopant) and the second dopant such as Al to be contained in the sintered compact. That is, both solid dissolution of Mg and orientation thus can be achieved. This technique can lower the resistivity of the zinc oxide sintered compact to a usable level as a conductive material (for example, less than $2.0 \times 10^{-2}$ Ω·cm less or than $2 \times 10^{0}$ Ω·cm depending on the application), and also improve the transparency of the zinc oxide sintered compact. In addition, the solid dissolution of Mg can control the band gap of the zinc oxide substrate. The present invention provides a Mg-containing zinc oxide sintered compact excellent in orientation (desirably, orientation and transparency, more desirably orientation, transparency and conductivity).

The zinc oxide sintered compact of the present invention contains 1 to 10 wt % Mg as a first dopant element, 0.05 wt % or more at least one second dopant element selected from the group consisting of Al, Ga and In, the balance consisting essentially of ZnO. It should be understood that the balance consisting essentially of ZnO may contain incidental impurities in addition to ZnO. The first dopant, Mg, is an element that can control the band gap. The content of Mg (first dopant) ranges from 1 to 10 wt %, preferably from 1 to 8 wt %, more preferably from 1 to 7 wt %, still more preferably from 1 to 6 wt %, particularly preferably 1 to 5 wt %, most preferably 1 to 4 wt % based on the total weight of the zinc oxide sintered compact. The Mg content within such a range precludes precipitation of $MgAl_2O_4$, $ZnAl_2O_4$, and MgO having different phases, and thus can improve the transparency and conductivity of the zinc oxide sintered compact. The second dopant element provides a zinc oxide sintered compact with desired characteristics (preferably conductivity) satisfying the application and specification, and contributes improved orientation at the same time. A particularly preferred second dopant element is Al. The content of the dopant element is 0.005 wt % or more, desirably 0.02 wt % or more, preferably 0.005 to 0.80 wt %, more preferably 0.005 to 0.60 wt %, further more preferably 0.005 to 0.40 wt %, particularly preferably 0.005 to 0.30 wt %, or alternately 0.02 to 0.80 wt %, more preferably 0.02 to 0.60 wt %, particularly preferably 0.02 to 0.40 wt %, most preferably 0.02 to 0.30 wt %, of the total weight of the zinc oxide sintered compact. As the content of the second dopant element decreases, the transparency of the zinc oxide sintered compact improves. The content of the third dopant element, which is an optional component, is preferably 0.80 wt % or less, more preferably 0.60 wt % or less, still more preferably 0.40 wt % or less, particularly preferably 0.30 wt % or less of the total weight of the zinc oxide sintered compact. The lower limit of the third dopant element, if being contained, is typically 0.005 wt % or more, typically 0.01 wt % or more of the total volume of the zinc oxide sintered compact, although the limit is not critical. A zinc oxide sintered compact is a solid consisting of numerous zinc oxide crystal particles bonded to each other after sintering. The zinc oxide crystal particles are composed of zinc oxide, and the first, second and third dopant elements may be replaced with Zn sites or O sites having a hexagonal wurtzite structure, may be contained as an additional element which does not constitute the crystal structure, or may be present in the grain boundary.

In the zinc oxide based sintered compact of the present invention, the (002)-plane or (100)-plane orientation in the plate surface is 60% or more, desirably 70% or more, preferably 75% or more, more preferably 85% or more, still more preferably 90% or more, particularly preferably 95% or more, particularly preferably 98% or more, most preferably 99% or more. As the (002)-plane or (100)-plane orientation increases, the light transmission advantageously improves and the device characteristics also advantageously improves in the case where the functional layers for optical devices, such as GaN-based materials and ZnO-based materials, are laminated. Examples of such improved device characteristics include the luminous efficiency in a light emitting device, the power generation efficiency in a solar cell, and the detection sensitivity in a photosensor. Accordingly, the upper limit of the (002)-plane or (100)-plane orientation is ideally 100%, although the limit is not critical.

The (002)-plane or (100)-plane orientation can be determined as follows: the XRD profile when the surface of the disk-shaped zinc oxide sintered compact is irradiated with X-rays is measured using an XRD apparatus (product name "RINT-TTR III" manufactured by Rigaku Corporation). The (002)-plane orientation can be calculated by the following expression.

$$(002)\text{Orientation}[\%] = \frac{p - p_0}{1 - p_0} \times 100 \qquad [\text{Expression 1}]$$

$$p_0 = \frac{I_0(002)}{I_0(100) + I_0(002) + I_0(101)}$$

$$p = \frac{I_s(002)}{I_s(100) + I_s(002) + I_s(101)}$$

where $I_0$ (hkl) and $I_s$ (hkl) represent diffraction intensities (integrated value) from the (hkl) planes in ICDD No. 361451 and a sample, respectively.

The (100)-plane orientation can be calculated by the following expression.

$$(100)\text{Orientation}[\%] = \frac{p - p_0}{1 - p_0} \times 100 \qquad [\text{Expression 2}]$$

$$p_0 = \frac{I_0(100)}{I_0(100) + I_0(002) + I_0(101)}$$

$$p = \frac{I_s(100)}{I_s(100) + I_s(002) + I_s(101)}$$

where $I_0$ (hkl) and $I_s$ (hkl) represent diffraction intensities (integrated value) from the (hkl) planes in ICDD No. 361451 and a sample, respectively.

The crystal particles constituting the zinc oxide sintered compact has an average particle size of preferably 5 µm or more, more preferably 10 µm or more, further preferably 20 to 200 µm. An average particle diameter within such a range advantageously improves the light transmission. The crystal particles constituting the zinc oxide sintered compact has an aspect ratio of preferably 1.70 or less, more preferably 1.50 or less, further preferably 1.00 to 1.40, particularly preferably 1.00 to 1.30. This aspect ratio indicates the ratio of the length in the direction parallel to the plate surface of the sintered compact to the length in the direction perpendicular to the plate surface of the sintered compact. An aspect ratio within the range advantageously improves the light transmission.

In the present invention, the average particle size and the aspect ratio can be determined as follows. A sample of about 10 mm square is cut out from a disk-shaped sintered compact, and the surface perpendicular to the disk surface is polished and etched with 0.3 M nitric acid for 10 sec. An image is then taken with a scanning electron microscope. The microscopic field is determined such that any one of straight lines drawn parallel to and perpendicular to the disk surface intersects 10 to 30 particles in the field. The average of the lengths of the inner line segments of all the individual particles that three straight lines drawn parallel to the disk surface intersect is multiplied by 1.5 to give a value $a_1$. Similarly, the average of the lengths of the inner line segments of all the individual particles that three straight lines drawn perpendicular to the disk surface intersect is multiplied by 1.5 to give another value $a_2$. The ratio $(a_1 + a_2)/2$ is defined as an average particle diameter, and the ratio $a_1/a_2$ is defined as an aspect ratio.

According to the present invention, the zinc oxide sintered compact, when evaluated in the form of a platy sample having a thickness of 200 µm, preferably has a total light transmittance of 20% or more, more preferably 25% or more, more preferably 30% or more, particularly preferably 35% or more over a wavelength region within the wavelength region 300 to 600 nm. Zinc oxide sintered compacts within these ranges have significantly high transparency.

According to the present invention, the zinc oxide sintered compact, when evaluated in the form of a platy sample having a thickness of 200 µm, preferably has a linear transmittance of 10% or more, more preferably 15% or more, more preferably 20% or more over a wavelength region within the wavelength region 300 to 600 nm. Zinc oxide sintered bodies within these ranges have significantly high transparency.

The zinc oxide sintered compact according to the present invention preferably has a resistivity of less than $2.0 \times 10^{-2}$ Ω·cm, more preferably less than $9.5 \times 10^{-3}$ Ω·cm, more preferably less than $7.5 \times 10^{-3}$ Ω·cm, particularly preferably less than $5.5 \times 10^{-3}$ Ω·cm, most preferably less than $4.5 \times 10^{-3}$ Ω·cm, but it may be less than $2 \times 10^{0}$ Ω·cm, depending on the application. The zinc oxide sintered compact within these ranges has a level of conductivity sufficiently usable as a conductive material.

Method for Production

The zinc oxide sintered compact according to the present invention may be produced by any method which renders the desired characteristics, but preferably produced by template grain growth (TGG). That is, as described above, solid dissolution of Mg in an oriented zinc oxide substrate is desirable to expand the band gap. It is, however, significantly difficult to prepare a zinc oxide sintered compact having high orientation (or high orientation and transparency) under solid dissolution of Mg. We have successfully prepared a zinc oxide sintered compact having a significantly high (002)-plane or (100)-plane orientation (60% or more, desirably 70% or more, for example 99% or more) in the plate surface by co-doping of the sintered compact with Mg (the first dopant), the second dopant such as Al, and the optional third dopant by template grain growth (TGG). Both solid dissolution of Mg and orientation can thereby be achieved. This technique can lower the resistivity of the zinc oxide sintered compact to a usable level as a conductive material (for example, less than $1 \times 10^{-2}$ Ω·cm), and also improve the transparency of the zinc oxide sintered compact. In addition, the solid dissolution of Mg can control the band gap of the zinc oxide substrate. A preferred method of production by TGG will be described below.

(1) Preparation of Template Particles and Matrix Particles

Prepared are template particles comprising ZnO and/or a precursor thereof having shape anisotropy and functioning as a template for promoting crystal orientation, and matrix particles comprising ZnO and/or its precursor having an average size smaller than or equal to the average size of the template particles.

(1a) Template Particles

The template particles have shape anisotropy and are composed of ZnO and/or a precursor thereof that functions as a template giving crystal orientation. The anisotropic shape indicates that the dimension in the longitudinal direction is larger than the dimension in the width direction and the thickness direction. Specific examples of the anisotropic shape preferably include a plate, a column, and a scale. Particularly preferred template particles are platy oriented ZnO crystal particles. The template particles have an average size greater than or equal to the average size of the matrix particles. For example, the template particles preferably have a volume-based $D_{50}$ median particle diameter of 0.5 to 30 µm, more preferably 0.5 to 25 µm, further preferably 0.5 to 20 µm, particularly preferably 0.5 to 15 µm. Such a range of diameter increases the orientation of the template particles, further improves the orientation of the sintered compact, and facilitates preparation of a green compact with improved transparency.

Particularly preferred template particles are platy oriented ZnO crystal particles. An exemplary method of production thereof will now be described. In the first stage of the method, platy particles of a zinc oxide precursor are produced by a solution process using a zinc ion-containing stock solution. Examples of the zinc ion source include organic acid salts (such as zinc sulfate, zinc nitrate, zinc chloride, zinc acetate) and zinc alkoxides. Zinc sulfate is preferred in view of supply of sulfate ions as described later. The zinc oxide precursor platy particles can prepared by any known solution process. The stock solution preferably contains a water-soluble organic substance and sulfate ions from the viewpoint of making porous particles having an increased specific surface area. Examples of water-soluble organic substances include alcohols, polyols, ketones, polyethers, esters, carboxylic acids, polycarboxylic acids, celluloses, saccharides, sulfonic acids, amino acids, and amines. More specific examples include aliphatic alcohols, such as methanol, ethanol, propanol, butanol, pentanol, and hexanol; aliphatic polyhydric alcohols, such as ethylene glycol, propanediol, butanediol, glycerin, poly(ethylene glycol), and poly(propylene glycol); aromatic alcohols, such as phenol, catechol, and cresol; heterocyclic alcohols, such as furfuryl alcohol; ketones, such as acetone, methyl ethyl ketone, and acetyl acetone; ethers and polyethers, such as ethyl ether, tetrahydrofuran, dioxane, polyoxyalkylene ether, ethylene oxide adducts, and propylene oxide adducts; esters, such as ethyl acetate, ethyl acetoacetate, and glycine ethyl esters; carboxylic acids, polycarboxylic acids, and hydroxycarboxylic acids, such as formic acid, acetic acid, propionic acid, butanoic acid, butyric acid, oxalic acid, malonic acid, citric acid, tartaric acid, gluconic acid, salicylic acid, benzoic acid, acrylic acid, maleic acid, glyceric acid, eleostearic acid, polyacrylic acid, polymaleic acid, and acrylic acid-maleic acid copolymers, and salts thereof; carboxymethyl celluloses; monosaccharides, such as glucose and galactose; polysaccharides, such as sucrose, lactose, amylose, chitin, and cellulose; sulfonic acids, such as alkylbenzenesulfonic acid, p-toluenesulfonic acid, alkylsulfonic acid, α-olefin sulfonic acid, polyoxyethylene alkylsulfonic acid, ligninsulfonic acid, and naphthalenesulfonic acid, and salts thereof; amino acids, such as glycine, glutamic acid, aspartic acid, and alanine; hydroxyamines, such as monoethanolamine, diethanolamine, triethanolamine, and butanolamine; trimethylaminoethyl alkylamides; alkyl pyridinium sulfates; alkyl trimethyl ammonium halides; alkyl betaines; and alkyl diethylenetriaminoacetic acids. Among these water-soluble organic substances, preferred are those having at least one functional group among a hydroxyl group, a carboxyl group and an amino group. Hydroxycarboxylic acids having a hydroxyl group and a carboxyl group (e.g., sodium gluconate and tartaric acid) and salts thereof are particularly preferred. The water-soluble organic substance is preferably contained in a range of about 0.001 wt % to about 10 wt % in a stock solution containing ammonia water described below. A preferred source of sulfate ions is zinc sulfate as described above. The stock solution may further contain additives such as the dopants described above. The stock solution is preferably heated to a preliminary reaction temperature of 70 to 100° C., more preferably 80 to 100° C. It is preferable that ammonia water is added to the stock solution after heating or during heating, and the stock solution containing ammonia water is maintained at 70 to 100° C. for 0.5 to 10 hr, more preferably 80 to 100° C. for 2 to 8 hr. The precursor platy particles are then heated to a calcination temperature at a heating rate of 150° C./hr or less and are calcined to prepare zinc oxide powder composed of zinc oxide platy particles. A heating rate of 150° C./hr or less probably allows the crystal face of the precursor to remain in zinc oxide during conversion from the precursor to zinc oxide, resulting in a high degree of orientation of the platy particles in the compact. It is also conceivable that the bonding force between the primary particles improves and the platy particles are hardly disintegrated. The heating rate is preferably 120° C./hr or less, more preferably 100° C./hr or less, further preferably 50° C./hr or less, particularly preferably 30° C./hr or less, most preferably 15° C./hr or less. Before the calcination, the zinc oxide precursor particles are preferably washed, filtered and dried. The calcination may be carried out at any temperature leading to conversion of a precursor compound, such as zinc hydroxide, to zinc oxide. The calcination temperature is preferably 800 to 1,100° C., more preferably 850 to 1,000° C., and the platy precursor particles are held at such a calcination temperature for preferably 0 to 3 hr, more preferably 0 to 1 hour. Such a temperature holding condition can reliably convert the precursor compound, such as zinc hydroxide, to zinc oxide. Such a calcination step converts the platy precursor particles to platy zinc oxide particles having many pores. Any other known process (refer to, for example, Non-Patent Document 6 (Gui Han et. al., e-J. Surf. Sci. Nanotech. Vol. 7 (2009) 354-357)) can also be used.

(1b) Matrix Particles

The matrix particles have a smaller or equal average particle size as the template particle and is composed of ZnO and/or its precursor. The matrix particles are equiaxially oriented particles not having shape anisotropy and/or shape anisotropic particles, typically spherical particles. Commercially available zinc oxide particles can be used without limitation. Although the matrix particles are typically non-oriented particles, they may also be oriented particles. The matrix particles preferably have a volume-based $D_{50}$ median particle diameter of 0.05 to 1.5 µm, more preferably 0.05 to 1 µm, further preferably 0.05 to 0.8 µm, particularly preferably 0.05 to 0.5 µm.

(2) Mixing Step

The template particles and the matrix particles are mixed to prepare a mixture. In this case, the weight ratio x:y of the template particles x and the matrix particles y is preferably 0.05:99.95 to 50:50, more preferably 0.05:99.95 to 40:60, and more preferably 0.05:99.95 to 30:70. Thus, a higher weight of matrix particles is preferably used compared to template particles in the method of the present invention. In this regard, in order to prepare a highly oriented sintered compact by a general method using, for example, a tape green compact other than the TGG, it is usual to use only platy oriented crystal particles corresponding to template particles. The method of the present invention using the TGG, is characterized by use of not only template particles but also matrix particles. In particular, it is unexpectedly preferred to determine the content of the template particles having the orientation property to be lower than that of the matrix particles. Mixing is preferably carried out in a Tri-Roll mill or a pot, where various additives and dopants can be added.

Prior to the preparation of the oriented green compact in the subsequent step, it is preferred that a first dopant element, Mg, at least one second dopant element selected from the group consisting of Al, Ga and In, and optionally a third dopant element be added to the template particles and/or matrix particles, or that such dopant elements be preliminarily contained in the template particles and/or the matrix particles. The third dopant element is at least one optional component selected from Br, Cl, F, Sn, Y, Pr, Ge, B, Sc, Si, Ti, Zr, Hf, Mn, Ta, W, Cu, Ni, Cr, La, Gd, Bi, Ce, Sr and Ba. Each of these first, second and third dopant elements may be added to the zinc oxide powder in the form of a compound or ion containing a dopant element. Preferred examples of the process of adding the dopant element-containing additive material includes, but not limited to, (1) addition of an additive substance to powdery zinc oxide in the form of a fine powder such as nanoparticles and (2) addition of zinc oxide powder after dissolving the additive substance in a solvent and then removing the solvent from the viewpoint of distribution of the additive substance to the inside of the fine pores of the zinc oxide powder. The Mg-containing additive substance (for example, magnesium oxide) may be added in an amount such that the final zinc oxide sintered compact has a Mg content of 1 to 10 wt %, preferably 1 to 8 wt %, more preferably 1 to 7 wt %, further more preferably 1 to 6 wt %, particularly preferably 1 to 5 wt %, most preferably 1 to 4 wt %. The additive substance containing a second dopant element may be added in an amount such that the final zinc oxide sintered compact has a second dopant element content of 0.005 wt % or more, desirably 0.02 wt % or more, preferably 0.005 to 0.80 wt %, more preferably 0.005 to 0.60 wt %, further preferably 0.005 to 0.40 wt %, particularly preferably 0.005 to 0.30 wt %, or alternatively more preferably 0.02 to 0.80 wt %, still more preferably 0.02 to 0.60 wt %, particularly preferably 0.02 to 0.40 wt %, most preferably 0.02 to 0.30 wt %. As the content of the second dopant element decreases, the transparency of the zinc oxide sintered compact improves. The additive substance containing a third dopant element as an optional component may be added in an amount such that the final zinc oxide sintered compact has a dopant element content of preferably 0.80 wt % or less, more preferably 0.60 wt % or less, more preferably 0.40 wt % or less, particularly preferably 0.30 wt % or less.

(3) Preparation of Oriented Green Compact

The resultant mixture is processed to orient the template particles in one direction due to shape anisotropy to prepare an oriented green compact. This process is preferably carried out by shaping the mixture into a sheet to prepare green compact sheets and optionally laminating the green compact sheets. The shaping of the mixture into the sheet is preferably performed by slurrying the mixture and then subjecting the mixture to tape casting.

The shaping technique may be any technique that can orient the template particles in one direction due to its shape anisotropy, preferably a technique using a shearing force. Since the template particles after shaping have shape anisotropy and are typically platy particles, a shaping process under shearing force applied to platy particles, for example, tape casting or extrusion molding is preferably used to prepare the green compact, and thereby, an oriented green compact having oriented platy particles can be easily prepared. Preferred examples of techniques using shear forces include tape casting, extrusion, doctor blading, and any combination thereof. Any orientation technique using shear force described above preferably involves incorporation of additives, such as a binder, a plasticizer, a dispersant, and a dispersion medium, to the platy zinc oxide powder to form a slurry, which is passed through a narrow discharge port to be discharged into a sheet on the substrate. The discharge port has a slit width of preferably in the range of 10 to 400 µm. The amount of the dispersion medium is adjusted such that the slurry viscosity is in the range of preferably from 5,000 to 100,000 cP, more preferably from 8,000 to 60,000 cP. The green sheet has a thickness in the range of preferably from 1 to 300 µm, more preferably from 10 to 200 µm. It is preferred to laminate a plurality of green compact sheets to form a precursor laminate having a desired thickness and to press-mold the precursor laminate. The precursor laminate is packed with, for example, a vacuum pack, which is preferably press-molded by isostatic pressing at a pressure of 10 to 2,000 kgf/cm$^2$ in warm water at 50 to 95° C. If extrusion is employed, the extrusion die may be designed such that green sheets pass through thin discharge ports in the die and then are integrated into a laminate in the die, and that the laminate is discharged from the die. The resulting green compact is preferably degreased under known conditions.

(4) Preparation of Zinc Oxide Sintered Compact

The resulting oriented green compact is heated to prepare a Mg-containing zinc oxide sintered compact. Any heat treatment which can prepare a desired zinc oxide sintered compact may be carried out by normal pressure sintering. For example, the oriented green compact may be sintered at a sintering temperature of 1,000 to 1,500° C., preferably 1,100 to 1,450° C. The sintering time at the above sintering temperature is not critical, for example it is preferably 1 to 10 hours, more preferably 2 to 5 hours. The zinc oxide sintered compact may be subjected to a hot isostatic pressing (HIP) treatment if necessary. This hot isostatic pressing (HIP) treatment is preferably carried out at 1,000 to 1,500° C. for 1 to 5 hr, more preferably 1 to 2 hr at 1,200 to 1,400° C. This HIP treatment may be applied to the zinc oxide sintered compact embedded in the zinc oxide powder, which further improves the light transmission of the zinc oxide sintered compact. In any case, the zinc oxide sintered compact prepared as described above has a high (002)-plane or (100)-plane orientation of, specifically, 60% or more, desirably 70% or more, preferably 75% or more, more preferably 85% or more, still preferably 90% or more, particularly preferably 95% or more, particularly preferably 98% or more, most preferably 99% or more in the plate surface.

EXAMPLES

The present invention will be further described in detail with reference to the following examples.

Example 1

(1) Preparation of Platy Zinc Oxide Powder

Zinc sulfate heptahydrate (1,730 g) (manufactured by Kojundo Chemical Laboratory Co., Ltd.) and sodium gluconate (4.5 g) (manufactured by Wako Pure Chemical Industries, Ltd.) were dissolved in deionized water (3,000 g). The solution was placed in a beaker and heated to 90° C. with stirring using a magnetic stirrer. After the solution was kept at 90° C., 25% ammonium water (490 g) was added dropwise with stirring using a micro tube pump. The mixture was kept at 90° C. with stirring for four hours and then allowed to stand. The precipitate was separated by filtration, washed with deionized water three times, and dried to yield a white powdery zinc oxide precursor. The resulting zinc oxide precursor (100 g) was placed on a zirconia setter and calcined in the air in an electric furnace to yield platy porous zinc oxide powder (65 g). The temperature program during the calcination involved heating from room temperature to 900° C. at a rate of 100° C./hr, holding at 900° C. for 30 min, and then spontaneous cooling.

(2) Preparation of Oriented Zinc Oxide Sintered Compact

The resulting platy zinc oxide powder was pulverized with a ball mill until the volume-based $D_{50}$ median particle diameter reached 3.5 μm to prepare template particles. The resulting template particles (oriented zinc oxide plate particles, volume-based $D_{50}$ median particle diameter: 3.5 μm) and matrix particles (zinc oxide fine particles, volume-based $D_{50}$ median particle diameter: 0.3 μm, manufactured by Sakai Chemical Industry Co., Ltd.) were mixed such that the ratio of the template particles/matrix particles was 5 wt %/95 wt % to prepare a zinc oxide powder mixture. The zinc oxide powder mixture (94.6 parts by weight), θ-alumina (TAIMICRON manufactured by Taimei Chemicals Co., Ltd.) (0.2 parts by weight), magnesium oxide (manufactured by Iwatani Chemical Industry Co., Ltd.) (5.2 parts by weight), a binder (poly(vinyl butyral): product number BM-2, manufactured by Sekisui Chemical Co., Ltd.), a plasticizer (DOP: di(2-ethylhexyl) phthalate, manufactured by Kurogane Kasei Co., Ltd.), a dispersant (product name: RHEODOL SP-030, manufactured by Kao Corporation), and a dispersion medium (2-ethylhexanol) were mixed in a Tri-Roll mill. The content of the dispersion medium was adjusted such that the slurry viscosity was 20,000 cP. The resulting slurry was formed by doctor blading on a PET film into a sheet having a dried thickness of 20 μm. The resulting tape was cut into pieces which are laminated, placed on an aluminum plate having a thickness of 10 mm, and then vacuum-packed. This vacuum pack was isostatically pressed in warm water at 85° C. under a pressure of 200 kgf/cm² to produce a disk-shaped green compact having a diameter of about 52 mm and a thickness of 1.5 mm. The green compact was placed in a degreasing furnace and degreased at 600° C. for 20 hours. The degreased compact was sintered at 1,400° C. for five hours under atmospheric pressure to prepare a disk-shaped sintered compact. The prepared sintered compact was placed in an alumina sheath having a size of 90 mm square and was subjected to hot isostatic pressing (HIP) treatment in Ar gas at 1,300° C. for 2 hr.

(3) Evaluation of Oriented Zinc Oxide Sintered Compact

The zinc oxide sintered compact was evaluated as follows. The results are shown in Tables 1A and 1B.

<Determination of Contents of Mg and Second Dopant>

The contents of Mg and a second dopant in a zinc oxide sintered compact were determined by inductively coupled plasma (ICP) emission spectroscopy.

<(002)-Plane Orientation>

The (002)-plane orientation was determined by measuring the plate surface of the disk-shaped sintered compact by XRD. Specifically, an XRD profile was measured when the surface of the disk-shaped zinc oxide sintered compact was irradiated with X-rays using an XRD apparatus (product name "RINT-TTR III" manufactured by Rigaku Corporation). The (002)-plane orientation was calculated by the following expression. The value of the (002)-plane orientation in this example was 0.999.

$$(002) \text{Orientation}[\%] = \frac{p - p_0}{1 - p_0} \times 100 \quad \text{[Expression 3]}$$

$$p_0 = \frac{I_0(002)}{I_0(100) + I_0(002) + I_0(101)}$$

$$p = \frac{I_s(002)}{I_s(100) + I_s(002) + I_s(101)}$$

where $I_0$ (hkl) and $I_s$ (hkl) represent diffraction intensities (integrated value) from the (hkl) planes in ICDD No. 361451 and the sample, respectively.

<Average Particle Size>

The average particle size of the substrate was determined as follows. A sample having a size of about 10 mm square was cut out from the substrate, and the surface perpendicular to the plate surface was polished and etched with 0.3 M nitric acid for 10 sec. An image was then taken with a scanning electron microscope. The microscopic field is determined such that any one of straight lines drawn parallel to and perpendicular to the plane surface intersects 10 to 30 particles in the field. The average of the lengths of the inner line segments of all the individual particles that three straight lines drawn parallel to the disk surface intersect is multiplied by 1.5 to give a value $a_1$. Similarly, the average of the lengths of the inner line segments of all the individual particles that three straight lines drawn perpendicular to the disk surface intersect is multiplied by 1.5 to give another value $a_2$. The ratio $(a_1+a_2)/2$ is defined as an average particle diameter.

<Aspect Ratio>

The aspect ratio $a_1/a_2$ was calculated from the $a_1$ and $a_2$ used for the determination of the average particle size of the substrate.

<Resistivity>

The resistivity of the substrate was measured by a four-probe method with a resistivity meter (Loresta GP, MCP-T610, manufactured by Mitsubishi Chemical Corporation).

<Measurement of Total Light Transmittance>

The total light transmittance of the substrate was measured with a spectrophotometer (Lambda 900, manufactured by Perkin Elmer, Inc.).

<Measurement of Linear Transmittance>

The linear transmittance of the substrate was measured with a spectrophotometer (Lambda 900, manufactured by Perkin Elmer, Inc.).

Example 2

A sintered compact was prepared and evaluated as in Example 1 except that the ratio of the template particles/matrix particles in the zinc oxide mixed powder was 20 wt %/80 wt % and the ratio of zinc oxide mixed powder/θ-alumina was 94.5/0.25 (in parts by weight). The results are shown in Tables 1A and 1B.

Example 3

A sintered compact was prepared and evaluated as in Example 1 except that hexagonal platy zinc oxide particles (volume-based $D_{50}$ median particle diameter: 0.8 μm) prepared as a template particle by the procedure described below were used and the ratio of template particles/matrix particles in the zinc oxide mixed powder was 5 wt %/95 wt %. The results are shown in Tables 1A and 1B.

Template particles were prepared as follows: Deionized water and an aqueous 0.10 M hexamethylenetetramine (hereinafter referred to as HMT) solution were added to a solution of 0.10 M sodium di-2-ethylhexylsulfosuccinate (hereinafter referred to as AOT) in 1-butanol to prepare a microemulsion. An aqueous 0.10 M solution of Zn (NO$_3$)$_2$ was then added to the microemulsion and stirred for mixing. The resulting mixture was gradually heated to 75° C. and kept at this temperature for 3 to 4 hr. The precipitate was separated by filtration and dried to yield hexagonal platy zinc oxide particles.

Example 4

A sintered compact was prepared and evaluated as in Example 1 except that the platy zinc oxide powder prepared in Example 1 was pulverized with a ball mill until the volume-based D$_{50}$ median particle diameter reached 5.0 μm to be used as template particles. The results are shown in Tables 1A and 1B.

Example 5

A sintered compact was prepared and evaluated as in Example 1 except that the ratio of zinc oxide mixed powder/θ-alumina/magnesium oxide was 97.3/0.2/2.5 (in parts by weight). The results are shown in Tables 1A and 1B.

Example 6

A sintered compact was prepared and evaluated as in Example 1 except that the ratio of zinc oxide mixed powder/θ-alumina/magnesium oxide was 88.8/0.2/11 (in parts by weight). The results are shown in Tables 1A and 1B.

Example 7

A sintered compact was prepared and evaluated as in Example 1 except that the ratio of the template particles/matrix particles in the zinc oxide mixed powder was 0.1 wt %/99.9 wt %, and the ratio of the zinc oxide mixed powder/θ-alumina was 94.6/0.2 (in parts by weight). The results are shown in Tables 1A and 1B.

Example 8

A sintered compact was prepared and evaluated as in Example 1 except that the ratio of template particles/matrix particles in the zinc oxide mixed powder was 45 wt %/55 wt %. The results are shown in Tables 1A and 1B.

Example 9

A sintered compact was prepared and evaluated as in Example 1 except that zinc oxide particles (the volume-based D$_{50}$ median particle diameter: 15 μm) prepared as the template by the procedure described below were used. The results are shown in Tables 1A and 1B.

Template particles were prepared as follows. To 100 parts by weight of the platy zinc oxide powder prepared in Example 1 (1) were added 15 parts by weight of a binder (poly(vinyl butyral): product number BM-2, manufactured by Sekisui Chemical Co., Ltd.) and 6.2 parts by weight of a plasticizer (DOP: di-(2-ethylhexyl) phthalate, manufactured by Kurogane Kasei Co., Ltd.), 3 parts by weight of a dispersant (product name: RHEODOL SP-O 30, manufactured by Kao Corporation) and a dispersion medium (2-ethylhexanol), resulting in a mixture. The content of the dispersion medium was adjusted such that the slurry viscosity was 10,000 cP. The slurry was formed into a sheet on a PET film by doctor blading such that the thickness after drying was 5 μm. The resulting tape was cut to produce a green compact of about 100 mm× about 100 mm square, which was then placed in a degreasing furnace and degreased at 600° C. for 20 hr. The degreased compact was sintered at normal pressure under atmospheric conditions at 1400° C. for 5 hr to prepare a sintered compact. The sintered compact was pulverized by a ball mill until the volume-based D$_{50}$ median particle diameter reached 15 μm to yield template particles.

Example 10

A sintered compact was prepared and evaluated as in Example 1 except that the ratio of zinc oxide mixed powder/θ-alumina/magnesium oxide was 94.7/0.1/5.2 (in parts by weight). The results are shown in Tables 1A and 1B.

Example 11

A sintered compact was prepared and evaluated as in Example 1 except that gallium oxide (commercially available) was used in place of θ-alumina. The results are shown in Tables 2A and 2B.

Example 12

A sintered compact was prepared and evaluated as in Example 1 except that indium oxide (commercially available) was used in place of θ-alumina. The results are shown in Tables 2A and 2B.

Example 13

A sintered compact was prepared and evaluated as in Example 1 except that zinc oxide type I (manufactured by Seido Chemical Industry., LTD, the volume-based D$_{50}$ median particle diameter: 0.8 μm) was used as matrix particles. The results are shown in Tables 2A and 2B.

Example 14

A sintered compact was prepared and evaluated as in Example 1 except that the ratio of zinc oxide mixed powder/θ-alumina/magnesium oxide was 92.9/2/5.1 (in parts by weight). The results are shown in Tables 2A and 2B.

Example 15

(Comparative)

A sintered compact was prepared and evaluated as in Example 1 except that the ratio of zinc oxide powder/magnesium oxide was 94.8/5.2 (in parts by weight) without addition of θ-alumina. The results are shown in Tables 2A and 2B.

Example 16

A sintered compact was prepared and evaluated as in Example 1 except that the ratio of zinc oxide mixed powder/θ-alumina/magnesium oxide was 97.5/0.01/2.5 (in parts by weight). The results are shown in Tables 2A and 2B.

Example 17

(Comparative)

A sintered compact was prepared and evaluated as in Example 1 except that the ratio of template particles/matrix particles in the zinc oxide mixed powder was 70 wt %/30 wt %. The results are shown in Tables 2A and 2B.

Example 18

(Comparative)
A sintered compact was prepared and evaluated as in Example 1 except that the ratio of template particles/matrix particles in the zinc oxide mixed powder was 0.01 wt %/99.99 wt %. The results are shown in Tables 2A and 2B.

Example 19

(Comparative)
A sintered compact was prepared and evaluated as in Example 1 except that the template particles (volume-based $D_{50}$ median particle diameter: 3.5 μm) prepared in Example 1 was used alone (i.e., zinc oxide powder of 100 wt % template particles) in place of the zinc oxide mixed powder in Example 1 and the ratio of zinc oxide powder/θ-alumina was 98.0/2.0 (in parts by weight) without addition of magnesium oxide. The results are shown in Tables 2A and 2B.

Example 20

(Comparative)
A sintered compact was prepared and evaluated as in Example 1 except that the template particles (volume-based $D_{50}$ median particle diameter: 3.5 μm) prepared in Example 1 was used alone (i.e., zinc oxide powder of 100 wt % template particles) in place of the zinc oxide mixed powder in Example 1 and the ratio of zinc oxide powder/magnesium oxide was 94.8/5.2 (in parts by weight) without addition of θ-alumina. The results are shown in Tables 2A and 2B.

Example 21

(Comparative)
A sintered compact was prepared and evaluated as in Example 1 except that the template particles (volume-based $D_{50}$ median particle diameter: 3.5 μm) prepared in Example 1 (i.e., zinc oxide powder with 100 wt % of template particles) were used alone in place of the zinc oxide mixed powder. The results are shown in Tables 2A and 2B.

Example 22

A sintered compact was prepared and evaluated as in Example 1 except that zinc oxide particles (the volume-based $D_{50}$ median particle diameter: 0.6 μm) as the template prepared by the procedure described below were used and the (100)-plane orientation was measured as follows instead of the (002)-plane orientation. The results are shown in Tables 3A and 3B.

Template particles were prepared as follows. An aqueous 0.1M $Zn(NO_3)_2$ solution was prepared with zinc nitrate hexahydrate (manufactured by KANTO CHEMICAL CO., LTD.). An aqueous 0.1M NaOH solution was prepared with sodium hydroxide (manufactured by Sigma-Aldrich Co. LLC). Aqueous $Zn(NO_3)_2$ solution was mixed with aqueous NaOH solution in a volume ratio of 1:1 and kept at 80° C. for 6 hours with stirring to yield a precipitate. The precipitate was washed three times with deionized water and then dried to give spherical secondary particles consisting of aggregated platy primary particles of zinc oxide. The secondary particles of zinc oxide was then subjected to a ball mill grinding treatment with spherical $ZrO_2$ media (2 mm in diameter) for 3 hours with ethanol as a solvent to be pulverized into platy primary particles having a volume-based $D_{50}$ median particle diameter of 0.6 μm.

<(100)-Plane Orientation>
The (100)-plane orientation was determined by measuring the plate surface of the disk-shaped sintered compact by XRD. The surface of the zinc oxide sintered compact was irradiated with X-rays using an XRD apparatus (product name "RINT-TTR III" manufactured by Rigaku Corporation). The (100)-plane orientation was calculated by the following expression.

$$(100)\text{Orientation}[\%] = \frac{p - p_0}{1 - p_0} \times 100 \qquad [\text{Expression 4}]$$

$$p_0 = \frac{I_0(100)}{I_0(100) + I_0(002) + I_0(101)}$$

$$p = \frac{I_s(100)}{I_s(100) + I_s(002) + I_s(101)}$$

where $I_0$ (hkl) and Is (hkl) represent diffraction intensities (integrated value) from the (hkl) planes in ICDD No. 361451 and the sample, respectively.

Example 23

A sintered compact was prepared and evaluated as in Example 22 except that the ratio of template particles/matrix particles in the zinc oxide mixed powder was 20 wt %/80 wt %. The results are shown in Tables 3A and 3B.

Example 24

A sintered compact was prepared and evaluated as in Example 1 except that the ratio of zinc oxide mixed powder/O-alumina/magnesium oxide was 94.76/0.025/5.2 (in parts by weight). The results are shown in Tables 4A and 4B.

Example 25

A sintered compact was prepared and evaluated as in Example 1 except that the ratio of zinc oxide mixed powder/O-alumina/magnesium oxide was 94.77/0.0125/5.2 (in parts by weight). The results are shown in Tables 4A and 4B.

Example 26

A sintered compact was prepared and evaluated as in Example 1 except that the hot isostatic pressing (HIP) treatment was applied to the sintered compact embedded in the zinc oxide powder. The results are shown in Tables 4A and 4B.

Example 27

A sintered compact was prepared and evaluated as in Example 5 except that the hot isostatic pressing (HIP) treatment was applied to the sintered compact embedded in the zinc oxide powder. The results are shown in Tables 4A and 4B.

Example 28

A sintered compact was prepared and evaluated as in Example 1 except that the ratio of zinc oxide mixed powder/O-alumina/magnesium oxide was 94.76/0.025/5.2 (in parts by weight) and the hot isostatic pressing (HIP) treatment was applied to the sintered compact embedded in the zinc oxide powder. The results are shown in Tables 4A and 4B.

Example 29

A sintered compact was prepared and evaluated as in Example 1 except that the ratio of zinc oxide mixed powder/θ-alumina/magnesium oxide was 91.94/0.025/8.0 (in parts by weight) and the hot isostatic pressing (HIP) treatment was applied to the sintered compact embedded in the zinc oxide powder. The results are shown in Tables 4A and 4B.

Example 30

A sintered compact was prepared and evaluated as in Example 1 except that $Y_2O_3$ (0.055 parts by weight) was added after the ratio of zinc oxide mixed powder/θ-alumina/magnesium oxide was set to 94.71/0.025/5.2 (in parts by weight) and the hot isostatic pressing (HIP) treatment was applied to the sintered compact embedded in the zinc oxide powder. The results are shown in Tables 4A and 4B.

Example 31

A sintered compact was prepared and evaluated as in Example 1 except that $Ga_2O_3$ (0.046 parts by weight) was added after the ratio of zinc oxide mixed powder/θ-alumina/magnesium oxide was set to 94.72/0.025/5.2 (in parts by weight) and the hot isostatic pressing (HIP) treatment was applied to the sintered compact embedded in the zinc oxide powder. The results are shown in Tables 4A and 4B.

TABLE 1A

| Ex. | Composition (wt %) | Mg Content (wt %) | Second dopant element content (wt %) | Weight ratio of zinc oxide powder template/matrix | Median particle diameter of template particles $D_{50}$ (μm) | Median particle diameter of matrix particles $D_{50}$ (μm) | (002)-plane orientation (%) |
|---|---|---|---|---|---|---|---|
| 1 | 94.6ZnO—5.2MgO—0.2Al$_2$O$_3$ (MgO: 10 mol %) | 3.14 | 0.11 | 5/95 | 3.5 | 0.3 | 99 |
| 2 | 94.5ZnO—5.2MgO—0.25Al$_2$O$_3$ (MgO: 10 mol %) | 3.12 | 0.13 | 20/80 | 3.5 | 0.3 | 98 |
| 3 | 94.6ZnO—5.2MgO—0.2Al$_2$O$_3$ (MgO: 10 mol %) | 3.14 | 0.10 | 5/95 | 0.8 | 0.3 | 97 |
| 4 | 94.6ZnO—5.2MgO—0.2Al$_2$O$_3$ (MgO: 10 mol %) | 3.13 | 0.11 | 5/95 | 5.0 | 0.3 | 99 |
| 5 | 97.3ZnO—2.5MgO—0.2Al$_2$O$_3$ (MgO: 5 mol %) | 1.53 | 0.11 | 5/95 | 3.5 | 0.3 | 99 |
| 6 | 88.8ZnO—11MgO—0.2Al$_2$O$_3$ (MgO: 20 mol %) | 6.62 | 0.11 | 5/95 | 3.5 | 0.3 | 89 |
| 7 | 94.6ZnO—5.2MgO—0.2Al$_2$O$_3$ (MgO: 10 mol %) | 3.14 | 0.12 | 0.1/99.9 | 3.5 | 0.3 | 73 |
| 8 | 94.6ZnO—5.2MgO—0.2Al$_2$O$_3$ (MgO: 10 mol %) | 3.13 | 0.12 | 45/55 | 3.5 | 0.3 | 76 |
| 9 | 94.6ZnO—5.2MgO—0.2Al$_2$O$_3$ (MgO: 10 mol %) | 3.11 | 0.11 | 5/95 | 15 | 0.3 | 81 |
| 10 | 94.7ZnO—5.2MgO—0.1Al$_2$O$_3$ (MgO: 10 mol %) | 3.14 | 0.05 | 5/95 | 3.5 | 0.3 | 99 |

TABLE 1B

| Ex. | Composition (wt %) | Resistivity (Ω·cm) | Total transmittance (%) at 450 nm | Linear transmittance (%) at 450 nm | Average particle size (μm) | Aspect ratio | Total transmittance (%) at 390 nm | Linear transmittance (%) at 390 nm |
|---|---|---|---|---|---|---|---|---|
| 1 | 94.6ZnO—5.2MgO—0.2Al$_2$O$_3$ (MgO: 10 mol %) | $2.9 \times 10^{-3}$ | 43 | 22 | 33 | 1.21 | 24 | 9 |
| 2 | 94.5ZnO—5.2MgO—0.25Al$_2$O$_3$ (MgO: 10 mol %) | $1.1 \times 10^{-3}$ | 34 | 18 | 31 | 1.26 | 12 | 4 |
| 3 | 94.6ZnO—5.2MgO—0.2Al$_2$O$_3$ (MgO: 10 mol %) | $3.5 \times 10^{-3}$ | 41 | 19 | 29 | 1.31 | 20 | 8 |
| 4 | 94.6ZnO—5.2MgO—0.2Al$_2$O$_3$ (MgO: 10 mol %) | $4.6 \times 10^{-3}$ | 39 | 17 | 26 | 1.34 | 19 | 7 |
| 5 | 97.3ZnO—2.5MgO—0.2Al$_2$O$_3$ (MgO: 5 mol %) | $8.2 \times 10^{-4}$ | 36 | 24 | 36 | 1.17 | 16 | 5 |
| 6 | 88.8ZnO—11MgO—0.2Al$_2$O$_3$ (MgO: 20 mol %) | $4.1 \times 10^{-3}$ | 30 | 15 | 24 | 1.38 | 11 | 3 |
| 7 | 94.6ZnO—5.2MgO—0.2Al$_2$O$_3$ (MgO: 10 mol %) | $6.9 \times 10^{-3}$ | 34 | 21 | 35 | 1.19 | 14 | 5 |
| 8 | 94.6ZnO—5.2MgO—0.2Al$_2$O$_3$ (MgO: 10 mol %) | $5.9 \times 10^{-3}$ | 26 | 8 | 9 | 1.53 | 8 | 2 |
| 9 | 94.6ZnO—5.2MgO—0.2Al$_2$O$_3$ (MgO: 10 mol %) | $7.2 \times 10^{-3}$ | 38 | 13 | 17 | 1.42 | 18 | 7 |
| 10 | 94.7ZnO—5.2MgO—0.1Al$_2$O$_3$ (MgO: 10 mol %) | $9.8 \times 10^{-3}$ | 46 | 25 | 39 | 1.14 | 28 | 11 |

TABLE 2A

| Ex. | Composition (wt %) | Mg Content (wt %) | Second dopant element content (wt %) | Weight ratio of zinc oxide powder template/matrix | Median particle diameter $D_{50}$ of template particles (μm) | Median particle diameter $D_{50}$ of matrix particles (μm) | (002)-plane orientation (%) |
|---|---|---|---|---|---|---|---|
| 11 | 94.6ZnO—5.2MgO—0.2Ga$_2$O$_3$ (MgO: 10 mol %) | 3.11 | 0.16 | 5/95 | 3.5 | 0.3 | 99 |
| 12 | 94.6ZnO—5.2MgO—0.2In$_2$O$_3$ (MgO: 10 mol %) | 3.09 | 0.18 | 5/95 | 3.5 | 0.3 | 99 |
| 13 | 94.6ZnO—5.2MgO—0.2Al$_2$O$_3$ (MgO: 10 mol %) | 3.15 | 0.10 | 5/95 | 3.5 | 0.8 | 89 |
| 14 | 92.9ZnO—5.1MgO—2Al$_2$O$_3$ (MgO: 10 mol %) | 3.08 | 1.05 | 5/95 | 3.5 | 0.3 | 99 |
| 15* | 94.8ZnO—5.2MgO (MgO: 10 mol %) | 3.14 | Al: 1 ppm | 5/95 | 3.5 | 0.3 | 6 |
| 16 | 97.5ZnO—2.5MgO—0.01Al$_2$O$_3$ (MgO: 5 mol %) | 1.58 | 50 ppm | 5/95 | 3.5 | 0.3 | 61 |
| 17* | 94.6ZnO—5.2MgO—0.2Al$_2$O$_3$ (MgO: 10 mol %) | 3.14 | 0.11 | 70/30 | 3.5 | 0.3 | 34 |
| 18* | 94.6ZnO—5.2MgO—0.2Al$_2$O$_3$ (MgO: 10 mol %) | 3.16 | 0.10 | 0.01/99.99 | 3.5 | 0.3 | 10 |
| 19* | 98ZnO—2Al$_2$O$_3$ | — | 1.07 | 100/0 | 3.5 | — | 89 |
| 20* | 94.8ZnO—5.2MgO (MgO: 10 mol %) | 3.13 | Al: 1 ppm | 100/0 | 3.5 | — | 4 |
| 21* | 94.6ZnO—5.2MgO—0.2Al$_2$O$_3$ (MgO: 10 mol %) | 3.16 | 0.10 | 100/0 | 3.5 | — | 5 |

*Indicates a comparative example.

TABLE 2B

| Ex. | Composition (wt %) | Resistivity (Ω·cm) | Total transmittance (%) at 450 nm | Linear transmittance (%) at 450 nm | Average particle size (μm) | Aspect ratio | Total transmittance (%) at 390 nm | Linear transmittance (%) at 390 nm |
|---|---|---|---|---|---|---|---|---|
| 11 | 94.6ZnO—5.2MgO—0.2Ga$_2$O$_3$ (MgO: 10 mol %) | $2.5 \times 10^{-3}$ | 34 | 18 | 28 | 1.34 | 14 | 5 |
| 12 | 94.6ZnO—5.2MgO—0.2In$_2$O$_3$ (MgO: 10 mol %) | $1.1 \times 10^{-3}$ | 38 | 20 | 29 | 1.32 | 17 | 6 |
| 13 | 94.6ZnO—5.2MgO—0.2Al$_2$O$_3$ (MgO: 10 mol %) | $4.3 \times 10^{-3}$ | 29 | 16 | 25 | 1.38 | 11 | 4 |
| 14 | 92.9ZnO—5.1MgO—2Al$_2$O$_3$ (MgO: 10 mol %) | $3.6 \times 10^{-4}$ | 22 | 5 | 7 | 1.59 | 4 | 0.5 |
| 15* | 94.8ZnO—5.2MgO (MgO: 10 mol %) | $4.8 \times 10^{-1}$ | 4 | 2 | 31 | 1.25 | 0 | 0 |
| 16 | 97.5ZnO—2.5MgO—0.01Al$_2$O$_3$ (MgO: 5 mol %) | $1.2 \times 10^{-1}$ | 51 | 29 | 43 | 1.12 | 39 | 15 |
| 17* | 94.6ZnO—5.2MgO—0.2Al$_2$O$_3$ (MgO: 10 mol %) | $5.2 \times 10^{-3}$ | 28 | 14 | 21 | 1.44 | 9 | 1.5 |
| 18* | 94.6ZnO—5.2MgO—0.2Al$_2$O$_3$ (MgO: 10 mol %) | $8.7 \times 10^{-3}$ | 27 | 15 | 23 | 1.39 | 8 | 1 |
| 19* | 98ZnO—2Al$_2$O$_3$ | $5.8 \times 10^{-4}$ | 15 | 2 | 7 | 1.81 | 4 | 0.5 |
| 20* | 94.8ZnO—5.2MgO (MgO: 10 mol %) | $6.7 \times 10^{-1}$ | 5 | 2 | 25 | 1.32 | 0 | 0 |
| 21* | 94.6ZnO—5.2MgO—0.2Al$_2$O$_3$ (MgO: 10 mol %) | $3.1 \times 10^{-3}$ | 25 | 12 | 22 | 1.42 | 7 | 1 |

*Indicates a comparative example.

TABLE 3A

| Ex. | Composition (wt %) | Mg Content (wt %) | Second dopant element content (wt %) | Weight ratio of zinc oxide powder template/matrix | Median particle diameter $D_{50}$ of template particles (μm) | Median particle diameter $D_{50}$ of matrix particles (μm) | (100)-plane orientation (%) |
|---|---|---|---|---|---|---|---|
| 22 | 94.6ZnO—5.2MgO—0.2Al$_2$O$_3$ (MgO: 10 mol %) | 3.10 | 0.11 | 5/95 | 0.6 | 0.3 | 73 |
| 23 | 94.6ZnO—5.2MgO—0.2Al$_2$O$_3$ (MgO: 10 mol %) | 3.11 | 0.11 | 20/80 | 0.6 | 0.3 | 91 |

TABLE 3B

| Ex. | Composition (wt %) | Resistivity (Ω·cm) | Total Transmittance (%) at 450 nm | Linear Transmittance (%) at 450 nm | Average particle size (μm) | Aspect ratio | Total Transmittance (%) at 390 nm | Linear Transmittance (%) at 390 nm |
|---|---|---|---|---|---|---|---|---|
| 22 | 94.6ZnO—5.2MgO—0.2Al$_2$O$_3$ (MgO: 10 mol %) | $2.8 \times 10^{-3}$ | 23 | 12 | 32 | 1.27 | 4 | 0.5 |
| 23 | 94.6ZnO—5.2MgO—0.2Al$_2$O$_3$ (MgO: 10 mol %) | $2.2 \times 10^{-3}$ | 27 | 15 | 30 | 1.25 | 9 | 1 |

TABLE 4A

| Ex. | Composition (wt % or weight ratio) | Mg Content (wt %) | Second dopant element content (wt %) | Third dopant element content (wt %) | Weight ratio of zinc oxide powder template/matrix | Median particle diameter D$_{50}$ of template particles (μm) | Median particle diameter D$_{50}$ of matrix particles (μm) | (002)-plane orientation (%) |
|---|---|---|---|---|---|---|---|---|
| 24 | 94.76ZnO—5.2MgO—0.025Al$_2$O$_3$ (MgO: 10 mol %) | 3.13 | 0.013 | — | 5/95 | 3.5 | 0.3 | 79 |
| 25 | 94.77ZnO—5.2MgO—0.0125Al$_2$O$_3$ (MgO: 10 mol %) | 1.54 | 65 ppm | — | 5/95 | 3.5 | 0.3 | 64 |
| 26 | 94.6ZnO—5.2MgO—0.2Al$_2$O$_3$ (MgO: 10 mol %) | 3.14 | 0.11 | — | 5/95 | 3.5 | 0.3 | 99 |
| 27 | 97.3ZnO—2.5MgO—0.2Al$_2$O$_3$ (MgO: 5 mol %) | 1.54 | 0.11 | — | 5/95 | 3.5 | 0.3 | 99 |
| 28 | 94.76ZnO—5.2MgO—0.025Al$_2$O$_3$ (MgO: 10 mol %) | 3.13 | 0.013 | — | 5/95 | 3.5 | 0.3 | 93 |
| 29 | 91.94ZnO—8.0MgO—0.025Al$_2$O$_3$ (MgO: 15 mol %) | 4.84 | 0.012 | — | 5/95 | 3.5 | 0.3 | 92 |
| 30 | 94.71ZnO—5.2MgO—0.025Al$_2$O$_3$—0.055Y$_2$O$_3$ (MgO: 10 mol %) | 3.13 | 0.013 | Y: 0.043 | 5/95 | 3.5 | 0.3 | 65 |
| 31 | 94.72ZnO—5.2MgO—0.025Al$_2$O$_3$—0.046Ga$_2$O$_3$ (MgO: 10 mol %) | 3.13 | 0.047 (Al: 0.013 + Ga: 0.034) | — | 5/95 | 3.5 | 0.3 | 96 |

TABLE 4B

| EX. | Composition (wt % or weight ratio) | Resistivity (Ω·cm) | Total Transmittance (%) at 450 nm | Linear Transmittance (%) at 450 nm | Average particle size (μm) | Aspect ratio | Total Transmittance (%) at 390 nm | Linear Transmittance (%) at 390 nm |
|---|---|---|---|---|---|---|---|---|
| 24 | 94.76ZnO—5.2MgO—0.025Al$_2$O$_3$ (MgO: 10 mol %) | $8.4 \times 10^{-3}$ | 49 | 27 | 42 | 1.13 | 37 | 12 |
| 25 | 94.77ZnO—5.2MgO—0.0125Al$_2$O$_3$ (MgO: 10 mol %) | $1.3 \times 10^{-2}$ | 53 | 30 | 44 | 1.10 | 41 | 18 |
| 26 | 94.6ZnO—5.2MgO—0.2Al$_2$O$_3$ (MgO: 10 mol %) | $1.9 \times 10^{-2}$ | 63 | 35 | 27 | 1.26 | 45 | 22 |
| 27 | 97.3ZnO—2.5MgO—0.2Al$_2$O$_3$ (MgO: 5 mol %) | $6.5 \times 10^{-3}$ | 58 | 31 | 30 | 1.24 | 31 | 10 |
| 28 | 94.76ZnO—5.2MgO—0.025Al$_2$O$_3$ (MgO: 10 mol %) | $5.7 \times 10^{-1}$ | 69 | 40 | 37 | 1.16 | 58 | 28 |
| 29 | 91.94ZnO—8.0MgO—0.025Al$_2$O$_3$ (MgO: 15 mol %) | $2.5 \times 10^{0}$ | 71 | 42 | 30 | 1.23 | 62 | 32 |
| 30 | 94.71ZnO—5.2MgO—0.025Al$_2$O$_3$—0.055Y$_2$O$_3$ (MgO: 10 mol %) | $1.6 \times 10^{-1}$ | 70 | 39 | 39 | 1.14 | 59 | 26 |
| 31 | 94.72ZnO—5.2MgO—0.025Al$_2$O$_3$—0.046Ga$_2$O$_3$ (MgO: 10 mol %) | $7.5 \times 10^{-2}$ | 71 | 39 | 38 | 1.15 | 60 | 27 |

What is claimed is:

1. A platy Mg-containing zinc oxide sintered compact comprising:
   1 to 10 wt % Mg as a first dopant element; and
   0.005 wt % or more at least one second dopant element selected from the group consisting of Al, Ga and In, the balance consisting essentially of ZnO and optionally at least one third dopant element selected from the group consisting of Br, Cl, F, Sn, Y, Pr, Ge, B, Sc, Si, Ti, Zr, Hf, Mn, Ta, W, Cu, Ni, Cr, La, Gd, Bi, Ce, Sr and Ba,
   wherein the platy Mg-containing zinc oxide sintered compact has a plate surface having a (002)-plane or (100)-plane orientation that is 60% or more.

2. The Mg-containing zinc oxide sintered compact according to claim 1, wherein the (002)-plane or (100)-plane orientation is 70% or more.

3. The Mg-containing zinc oxide sintered compact according to claim 1, wherein the (002)-plane or (100)-plane orientation is 90% or more.

4. The Mg-containing zinc oxide sintered compact according to claim 1, having a resistivity of less than $2.0 \times 10^{-2}$ Ω·cm.

5. The Mg-containing zinc oxide sintered compact according to claim 1, wherein the zinc oxide sintered compact, when evaluated in the form of a platy sample having a thickness of 200 µm, has a total light transmittance of 20% or more over a wavelength region within the wavelength region 300 to 600 nm.

6. The Mg-containing zinc oxide sintered compact according to claim 1, wherein the zinc oxide sintered compact, when evaluated in the form of a platy sample having a thickness of 200 µm, has a linear light transmittance of 10% or more over a wavelength region within the wavelength region 300 to 600 nm.

7. The Mg-containing zinc oxide sintered compact according to claim 1, wherein crystal particles constituting the zinc oxide sintered compact has an average particle size of 10 µm or more and an aspect ratio of 1.50 or less.

8. The Mg-containing zinc oxide sintered compact according to claim 1, wherein the content of the second dopant element is 0.005 to 0.80 wt %.

9. The Mg-containing zinc oxide sintered compact according to claim 1, wherein the content of the second dopant element is 0.02 wt % or more.

10. The Mg-containing zinc oxide sintered compact according to claim 1, wherein the content of the second dopant element is 0.02 to 0.80 wt %.

11. The Mg-containing zinc oxide sintered compact according to claim 1, wherein the second dopant element is Al.

12. A method for producing the Mg-containing zinc oxide sintered compact according to claim 1, comprising the steps of:
   i) providing template particles comprising ZnO and/or a precursor thereof having shape anisotropy and functioning as a template for promoting crystal orientation, and matrix particles comprising ZnO and/or its precursor having an average size smaller than or equal to the average size of the template particles,
   ii) mixing the template particles and the matrix particles to yield a mixture,
   iii) shaping the mixture into an oriented green compact, the template particles being oriented in one direction due to the shap anisotrophy in the oriented green compact, and
   iv) heat-treating the oriented green compact to yield a Mg-containing zinc oxide sintered compact,
   wherein prior to preparation of the oriented green compact, the first dopant element, the second dopant element, and optionally the third dopant element are added to or preliminarily contained in the template particles and/or the matrix particles.

13. The method according to claim 12, wherein the template particles are platy oriented ZnO crystal particles.

14. The method according to claim 12, wherein the weight ratio xy of the template particles x and the matrix particles y in the mixing step 0.05:99.95 to 50:50.

15. The method according to claim 12, wherein the template particles have a volume-based $D_{50}$ median particle size of from 0.5 to 30 µm.

16. The method according to claim 12, wherein the matrix particles have a volume-based $D_{50}$ median particle size of from 0.05 to 1.5 µm.

17. The method according to claim 12, wherein step iii) comprises shaping the mixture into a sheet to prepare green compact sheets and optionally laminating the green compact sheets.

18. The method according to claim 17, wherein the shaping of the mixture into the sheet comprises slurrying the mixture and then subjecting the mixture to tape casting.

19. The method according to claim 17, wherein the green compact sheet has a thickness of 1 to 300 µm.

20. The method according to claim 12, further comprising a step of subjecting the zinc oxide sintered compact to a hot isostatic pressing (HIP) treatment, wherein the treatment is applied to the zinc oxide sintered compact embedded in the zinc oxide powder.

* * * * *